United States Patent
Arora et al.

(10) Patent No.: US 10,380,507 B2
(45) Date of Patent: Aug. 13, 2019

(54) METHOD FOR CUSTOMISING A TRAVEL ITINERARY

(71) Applicant: MasterCard International Incorporated, Purchase, NY (US)

(72) Inventors: Ankur Arora, New Delhi (IN); Priyanka Taneja, Haryana (IN)

(73) Assignee: Mastercard International Incorporated, Purchase, NY (US)

( * ) Notice: Subject to any disclaimer, the term of this patent is extended or adjusted under 35 U.S.C. 154(b) by 386 days.

(21) Appl. No.: 15/249,604

(22) Filed: Aug. 29, 2016

(65) Prior Publication Data

US 2017/0060875 A1 Mar. 2, 2017

(51) Int. Cl.
- *G06F 7/00* (2006.01)
- *G06F 17/30* (2006.01)
- *G06Q 10/04* (2012.01)
- *G06Q 50/14* (2012.01)

(52) U.S. Cl.
CPC .......... *G06Q 10/04* (2013.01); *G06Q 50/14* (2013.01)

(58) Field of Classification Search
CPC .... G06Q 10/04; G06Q 50/14; G06Q 20/4016; G06Q 20/10; G06Q 20/24; G06Q 20/401; G06Q 20/3278; G06Q 20/327; G06Q 30/0231; G06Q 30/0224; G06Q 30/0215; G06F 17/3053; G06F 17/30598; G06F 17/30312
See application file for complete search history.

(56) References Cited

U.S. PATENT DOCUMENTS

| | | | |
|---|---|---|---|
| 2008/0082373 A1 | 4/2008 | Durocher et al. | |
| 2009/0210262 A1 | 8/2009 | Rines et al. | |
| 2012/0109749 A1* | 5/2012 | Subramanian | G06Q 30/0255 705/14.53 |
| 2014/0279311 A1* | 9/2014 | Just | G06Q 40/12 705/30 |
| 2015/0095073 A1* | 4/2015 | Li | G06O 50/14 705/6 |
| 2015/0127486 A1 | 5/2015 | Advani | |
| 2016/0012514 A1* | 1/2016 | Brown | G06O 30/0635 705/26.81 |

OTHER PUBLICATIONS

"PCT Notification of Transmittal of the International Search Report and the Written Opinion" International Searching Authority, Nov. 22, 2016 (Nov. 22, 2016), for International Application No. PCT/US2016/047729, 7pgs.

* cited by examiner

*Primary Examiner* — Azam M Cheema
(74) *Attorney, Agent, or Firm* — Buckley, Maschoff & Talwalkar LLC (57) ABSTRACT

A computer-implemented method for customizing a travel itinerary for an account holder is provided. The method comprises receiving current transaction data when settling a current travel transaction initiated by the account holder with a current merchant; retrieving a plurality of historical transaction data relating to a plurality of historical transactions settled for the account holder prior to the current travel transaction; identifying one or more of the plurality of historical transactions that relate to the current transaction data to recognize preferences of the account holder; and customizing a travel itinerary based on the preferences of the account holder, the travel itinerary including at least one merchant with whom the account holder can initiate a future transaction.

17 Claims, 4 Drawing Sheets

METHOD FOR CUSTOMISING A TRAVEL ITINERARY

CROSS-REFERENCE TO RELATED APPLICATION

This application is a U.S. National Stage filing under 35 U.S.C. § 119, based on and claiming benefit of and priority to SG Patent Application No. 10201506939U filed Sep. 1, 2015.

FIELD OF INVENTION

The present invention relates broadly, but not exclusively, to methods for customising travel itineraries.

BACKGROUND

In the recent times, international tourism has become one of the most thriving markets. In 2010, the number of international tourist arrivals throughout the world reached 948 million. In 2012, they reached 1.04 billion.

Travel usually involves planning for activities to do during the trip, and the activities include commuting, site seeing, dinning, lodging, shopping, and the like. These travel activities are all related to purpose of the trip and may be described as a schedule or itinerary. A trip is supposed to be a relaxing event. However, statistics indicate that a traveller's planning duration of 100 days average and 60 days median before travel date. Currently, there are websites that allow a user to plan a general travel itinerary. However, such websites do not allow the user to automatically plan a travel itinerary that is based on his past spending behaviour.

A need therefore exists to provide methods for customising a travel itinerary that seek to address at least some of the above problems; particularly, methods for automatically customising a travel itinerary that is based on a user's past spending behaviour.

SUMMARY

According to a first aspect of the invention, a computer-implemented method for customising a travel itinerary for an account holder is provided. The method comprises receiving current transaction data when settling a current travel transaction initiated by the account holder with a current merchant; retrieving a plurality of historical transaction data relating to a plurality of historical transactions settled for the account holder prior to the current travel transaction; identifying one or more of the plurality of historical transactions that relate to the current transaction data to recognize preferences of the account holder; and customising a travel itinerary based on the preferences of the account holder, the travel itinerary including at least one merchant with whom the account holder can initiate a future transaction.

In one embodiment, the travel itinerary is further customised based on a relevance score of the at least one merchant, the relevance score indicating the relevance of the at least one merchant for the account holder based on the plurality of historical transactions.

In one embodiment, the method further comprises identifying a plurality of distinct merchants based on the plurality of historical transaction data; and obtaining an industry-type of each of the distinct merchants by referring to a database having stored thereon the industry-type of each of the distinct merchants, wherein the relevance score indicates the relevance of the at least one merchant based on (i) an industry-type of the at least one merchant and (ii) the industry-types of the distinct merchants.

In one embodiment, the method further comprises obtaining a location for each of the distinct merchants by referring to the database further having stored thereon the locations for each of the distinct merchants, wherein the relevance score indicates the relevance of the at least one merchant based on the distance between the obtained locations and a location of the at least one merchant.

In one embodiment, the method further comprises identifying a historical transaction amount for one of the plurality of historical transaction data to determine a transaction budget of the account holder, wherein the relevance score indicates the relevance of the at least one merchant based on the (i) a transaction amount with the at least one merchant and (ii) the transaction budget.

In one embodiment, the method further comprises obtaining a location where goods and/or services will be rendered based on the current transaction data, obtaining a popularity index for each of additional distinct merchants located in the vicinity of the obtained location, the popularity indexes indicating popularity of each of the distinct merchants among other account holders, wherein the travel itinerary is customised further based on the popularity indexes.

In one embodiment, the at least one merchant includes the current merchant.

In one embodiment, the travel itinerary includes at least one further merchant, and the method further comprising ranking the merchants in the travel itinerary based on the corresponding relevance score of the merchant.

In one embodiment, the at least one merchant included in the customised travel itinerary is presented to the user as an augmented reality setting.

In a second aspect of the invention, an apparatus for customising a travel itinerary for an account holder is provided. The apparatus comprises at least one processor; and at least one memory including computer program code; the at least one memory and the computer program code configured to, with at least one processor, cause the apparatus at least to: receive current transaction data when settling a current travel transaction initiated by the account holder with a current merchant; retrieve, from a database, a plurality of historical transaction data relating to a plurality of historical transactions settled for the account holder prior to the current travel transaction; identify one or more of the plurality of historical transactions that relate to the current transaction data to recognize indication of preferences of the account holder; and customise a travel itinerary based on the preferences, the travel itinerary including at least one merchant with whom the account holder can initiate a future transaction.

In a third aspect of the invention, there is provided a computer-readable storage medium having stored thereon computer program code which when executed by a computer causes the computer to execute a method in accordance with any of the above embodiments.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "receiving", "retrieving", "identifying", "customising" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Various embodiments of the present invention relate to methods for customising a travel itinerary. In an embodiment, the method is a computer-implemented method which customises a travel itinerary based on the historical transaction data of an account holder (or a customer).

In the following description, an account is a card that can be used by an account holder for a transaction with a merchant. The account is usually linked to the account holder's bank account. Examples of accounts include payment cards and digital wallets. In the following description, the term "payment cards" refer to any suitable transaction cards, such as credit cards, debit cards, prepaid cards, charge cards, membership cards, promotional cards, frequent flyer cards, identification cards, gift cards, and/or any other device that may hold payment account information, such as mobile phones, Smartphones, personal digital assistants (PDAs), key fobs, and/or computers. Each type of payment card can be used as a method of payment for performing a transaction.

In the following description, an account holder is a customer that initiates a transaction with a merchant. For example, the customer may initiate the transaction with the merchant to buy goods and/or services from the merchant. In another example, the customer may initiate the transaction with one merchant to buy goods and/or services from another merchant. In an embodiment, the transaction is a payment transaction. In other words, completion of the transaction involves a payment between parties to the transaction.

Figure 1:
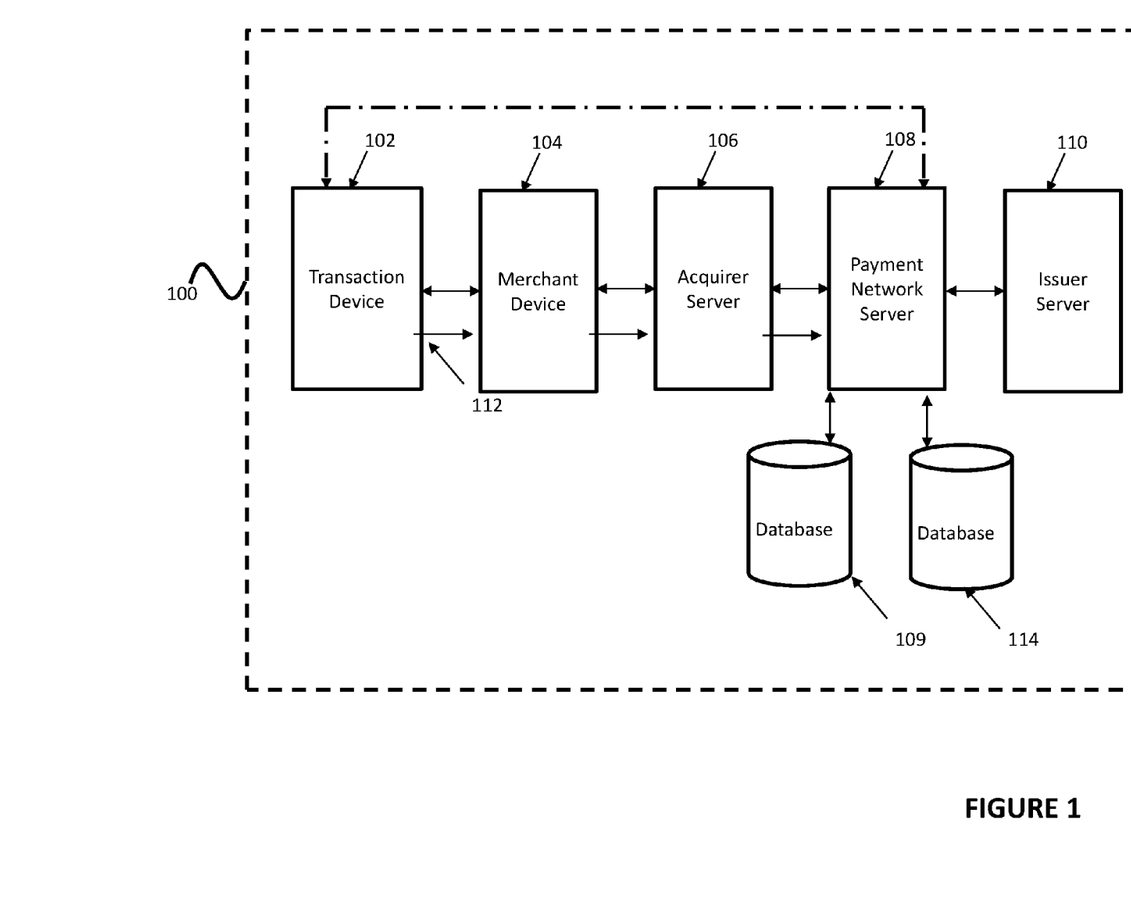
FIG. 1 shows a block diagram of a transaction system 100 within which transaction data can be received.

FIG. 1 illustrates a block diagram of a transaction system 100 within which transaction data can be received.

The system 100 comprises a transaction device 102 in communication with a merchant device 104. The transaction device 102 may also be in direct communication with a payment network server 108, without having to communicate with the merchant device 104.

The merchant device 104 is in communication with an acquirer server 106. The acquirer server 106, in turn, is in communication with a payment network server 108. The payment network server 108, in turn, is in communication with an issuer server 110.

Use of the term 'server' herein can mean a single computing device or a plurality of interconnected computing devices which operate together to perform a particular function. That is, the server may be contained within a single hardware unit or be distributed among several or many different hardware units.

The transaction device 102 typically is associated with a customer who is a party to a transaction that occurs between the transaction device 102 and the merchant device 104 through a transaction. The transaction device 102 may be a fixed (wired) computing device or a wireless (portable) computing device. In specific implementations, the transaction device 102 may be a handheld or portable or mobile device carried or used by the customer, or may refer to other types of electronic devices such as a personal computer, a land-line telephone or an interactive voice response (IVR) system and the like. The mobile device may be a device, such as a mobile phone, a tablet computer, a laptop computer, a personal digital assistant (PDA), a mobile computer, a portable music player (such as an iPod™ and the like).

The merchant device 104 typically is associated with the merchant which is also a party to the transaction that occurs between transaction device 102 and the merchant device 104 through the transaction. The merchant device 104 may be a point-of-sale (POS) terminal, an automatic teller machine (ATM), a personal computer, a computer server (hosting a website, for example), an interactive voice response (IVR) system, a land-line telephone, or any type of mobile device such as a mobile phone, a PDA, a laptop computer, a tablet computer and the like.

The acquirer server 106 generally is associated with an acquirer which may be an entity (e.g. a company or organization) which issues (e.g. establishes, manages, administers) a transaction credential or an account (e.g. a financial bank account) of the merchant. Examples of the acquirer include a bank and/or other financial institution. As stated in the above, the acquirer server 106 may include one or more computing devices that are used to establish communication with another server by exchanging messages with and/or passing information to the other server.

Figure 4:
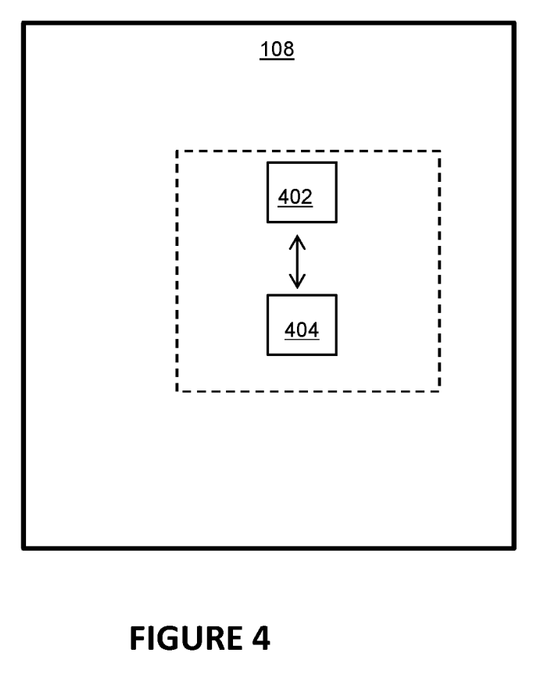
FIG. 4 shows an exemplary computing device to realize a server for the payment network server 108 shown in FIG. 1.

The payment network server 108 typically is associated with a payment facilitator. For example, the payment network server 108 may be the Banknet® network operated by MasterCard®. The payment facilitator (e.g. MasterCard®) may be an organization which operates to process transactions, clear and settle funds for payments between two entities (e.g. two banks). The payment network server 108 may include one or more computing devices that are used for processing transactions. An exemplary payment network server 108 is shown in FIG. 4.

The issuer server 110 generally is associated with an issuer and may include one or more computing devices that are used to perform a payment transaction. The issuer may be an entity (e.g. a company or organization) which issues (e.g. establishes, manages, administers) a transaction credential or an account (e.g. a financial bank account). An account may be associated with a plurality of transaction devices 102.

The payment network server 108 may be configured to communicate with, or may include, a database 109. The database 109 stores data corresponding to each account issued by the issuer and data corresponding to a transaction. Examples of the data include Transaction ID, Merchant ID, Merchant Name, MCC/Industry Code, Industry Description, Merchant Country, Merchant Address, Merchant Postal Code, Aggregate Merchant ID. For example, data ("Merchant name" or "Merchant ID") relating to the merchant, time and date for which the goods/services relating to the transaction will be delivered are included in the database 109. Further details on this data are described in FIG. 2 below.

In specific implementations, the payment network server 108 may also be configured to communicate with, or include, another database 114. The database 114 may be separate from the database 109. Alternatively, the database 114 may be included in the database 109. The database 114 stores a respective popularity index for each of a plurality of additional merchants. The popularity indexes may include review(s) of one of the additional merchant from a customer or the number of times a customer visits a merchant. The plurality of additional merchants may or may not include the merchants with whom the account holder is initiating a transaction. A popularity index for each of these additional merchants is obtained via recommendation-providing social media platforms such as Foursquare™ or Facebook™ or recommendation-providing websites such as TripAdvisor™.

In an example, during a transaction, a transaction request message 112 is generated at the transaction device 102. The transaction request message 112 is generated by the transaction device 102 in response to the customer making a selection of a good and/or service to be purchased from the merchant. In specific implementations of the present invention, the merchant that sells the good and/or service may or may not be the entity (or merchant) delivering it. For example, a trip to Hong Kong Disneyland™ may be purchased from a website of a travel agent. The travel agent is not the entity at which the service will be delivered.

In other words, the transaction request message relates 112 to a transaction between the customer and the merchant. The transaction may be performed via a website of the merchant. In specific implementations, transaction device 102 may be fitted with a wireless communications interface such as a Near Field Communication (NFC) interface to enable the transaction device 102 to electronically communicate with the merchant device 104 to perform the transaction. NFC is a set of standards to establish radio communication between devices by bringing them into close proximity such as only a few centimeters. NFC standards cover communication protocols and data exchange formats, and are based on radio-frequency identification (RFID) technology.

The transaction device 102 is capable of wireless communication using a suitable protocol with the merchant device 104. For example, embodiments may be implemented using transaction devices 102 that are capable of communicating with WiFi/Bluetooth-enabled merchant devices 104. It will be appreciated by a person skilled in the art that depending on the wireless communication protocol used, appropriate handshaking procedures may need to be carried out to establish communication between the transaction device 102 and the merchant device 104. For example, in the case of Bluetooth communication, discovery and pairing of the transaction device 102 and the merchant device 104 may be carried out to establish communication.

The transaction request message 112 may include an indicator relating to the transaction device 102 and/or transaction data. Each transaction data relates to a transaction and identifies the customer and the merchant, generally by way of identifiers of each associated with the customer and merchant respectively. Further, the transaction data may also identify the good and/or service to be purchased and a type or nature of the transaction. The transaction data may further identify a value or price of the good and/or service (e.g., a transaction amount) and a location where the good and/or service will be delivered. The transaction data may also indicate a time and date at which the transaction was initiated.

The following types of transaction data may be included in the transaction request message 112:

Transaction Level Information:—
Transaction ID
Account ID (anonymized)
Merchant ID
Transaction Amount
Transaction Local Currency Amount
Date of Transaction
Time of Transaction Type of Transaction
Date of Processing
Cardholder Present Code
Merchant Category Code (MCC)
Account Information:—
Account ID (anonymized)
Card Group Code
Card Product Code
Card Product Description
Card Issuer Country
Card Issuer ID
Card Issuer Name
Aggregate Card Issuer ID
Aggregate Card Issuer Name
Merchant Information:—
Merchant ID
Merchant Name
MCC/Industry Code
Industry Description
Merchant Country
Merchant Address
Merchant Postal Code
Aggregate Merchant ID
Aggregate Merchant Name
Merchant Acquirer Country
Merchant Acquirer ID
Issuer Information:—
Issuer ID
Issuer Name
Aggregate Issuer ID
Issuer Country The transaction request message 112 is sent from the transaction device 102 to the merchant device 104. In a disclosed embodiment, for example where the transaction is being performed at the website of the merchant, the transaction device 102 and the merchant device 104 are in communication with a network, such as, the Internet (not shown for the sake of simplicity). In this example, the transaction request message 112 is sent from the transaction device 102 to the merchant device 104 via the network.

As mentioned above, the role of the payment network server 108 is to facilitate communication between the acquirer server 106 and the issuer server 110. Therefore, the payment network server 108 may serve as a means through which the acquirer server 106 may communicate with the issuer server 110 in order that payments and authentication may be performed. In specific implementations, the payment network server 108 may receive transaction data when settling a transaction for an account holder and subsequently store the transaction data in the database 109. Alternatively or additionally, the payment network service 108 may be configured to retrieve transaction data that is stored in the database 109 or the database 114.

The transaction authorization process described above involves multiple parties (e.g., account holder, merchant, acquirer, issuer, payment facilitator). However, the transaction authorization process may be essentially viewed as a transaction between an account holder and a merchant (with the other parties facilitating the transaction).

Figure 2:
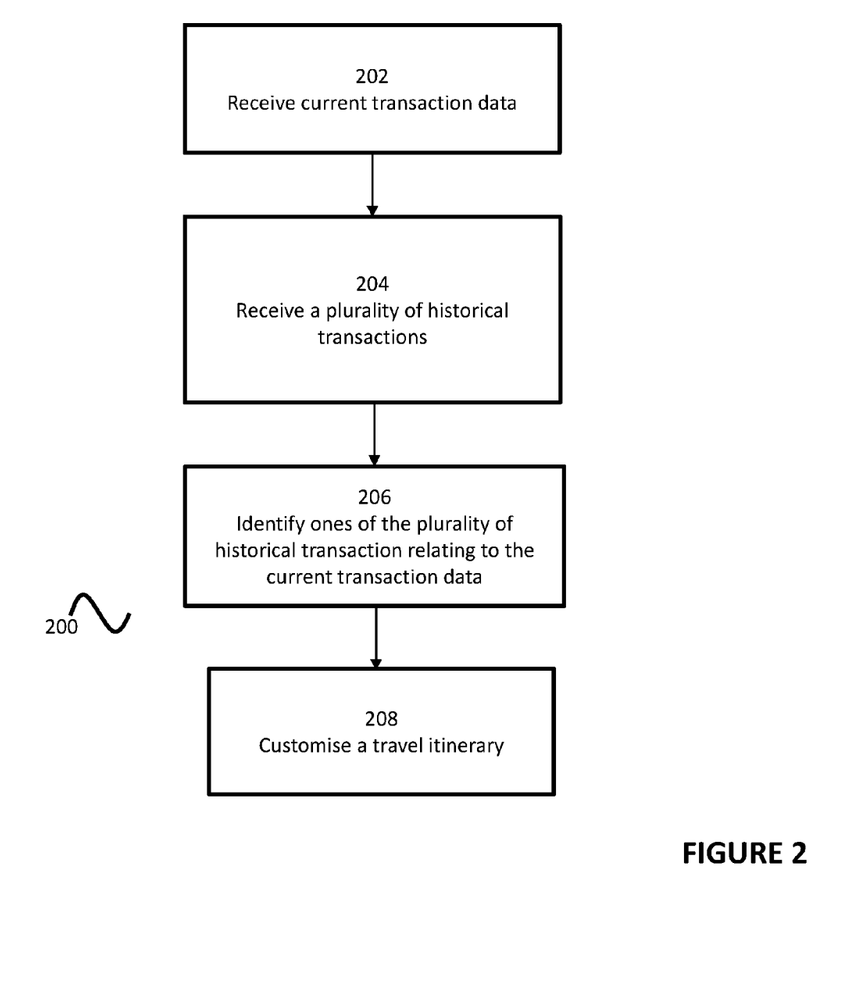
FIG. 2 shows a flow chart illustrating a computer-implemented method for customising a travel itinerary according to an example embodiment.

FIG. 2 shows a flow chart 200 illustrating a computer-implemented method for customising a travel itinerary according to an example embodiment. At step 202, transaction data is received, at a payment network server, when settling a current transaction initiated by an account holder with a merchant. In the following description, as the travel transaction data is obtained before the travel event occurs, it is referred to as "current travel transaction data", which is meant to be differentiated from "historical transaction data" which is data that is obtained prior to the current travel transaction.

At step 204, a plurality of historical transaction data, relating to a plurality of historical transactions settled for the account holder prior to the current travel transaction, is retrieved by the payment network server 108. The historical transaction data that is retrieved contains, among other information, the identity of the merchant (e.g., Merchant ID). As such, the merchants with whom account holders have made transactions prior to the current travel transaction can be identified based on the corresponding identities of the merchant in the historical transaction data.

If an account holder uses his account to initiate a transaction relating to travel, transaction data pertaining to the travel transaction will be generated and received at the payment network server 108 via the merchant. It can be assumed that the account holder will be present at the time and place that the services or goods, for which the transaction relates to, will be rendered or delivered. For example, if Sam were to use his account to buy two tickets to Hong Kong Disneyland on 25 Dec. 2015, it can be assumed that Sam will be going to Hong Kong Disneyland on 25 Dec. 2015.

Based on this assumption, historical transaction data that relates to transactions initiated by the account holder before the current transaction will be retrieved. This makes it possible to analyse the spending behaviour of the account holder based on the transaction data that is generated from transactions made between the account holder and other merchants prior to the current travel transaction. If necessary, various algorithms/rules will be applied to do the analysis.

At step 206, transaction data that relate to the current transaction data are identified. In an implementation, the transaction data are used to recognise preferences of the account holder. For example, transaction data that relate to a previous travel may be used to identify the type of goods or services that the account holder purchased during a vacation.

In an implementation, the database contains a list of merchants, their corresponding locations (e.g. postal address and/or latitude/longitude) and their industry-types may be obtained. A look-up procedure may be used to obtain the merchant's location once the merchant is identified. The list of merchants may contain the name of the merchant ("Merchant name"), or merchant identifier ("Merchant ID"), or any suitable identifier capable of uniquely identifying a merchant. Based on these information, it is possible the types of merchants that the account holder likes to visit based on the historical transactions.

After step 206 is performed, step 208 may be performed. Step 208 involves proposing a customised travel itinerary based on the preferences of the account holder. A travel itinerary will then be customised to include suggestions which the account holder may do during travel (including the time at which the goods/services relating to the transaction will be delivered). In other words, the travel itinerary includes at least one merchant with whom the account holder can initiate a transaction during his trip. For example, the travel itinerary may include places that the account holder may visit, dining options that the account holder may dine at and/or activities that the account holder may do. In other words, the customised travel itinerary is one which includes at least one suggested merchant with whom the account holder can initiate a future travel transaction. That is, if the account holder's preference is to visit a spa resort during his vacation based on his historical transaction data, the customised travel itinerary will include a spa resort that he can visit when he visits Hong Kong Disneyland.

For example, the merchant included in the customised travel itinerary can also be ranked based on the number of times the account holder has visited a certain merchant in the past. There may be a possibility that the account holder patronizes a particular merchant more than once. For example, the account holder patronizes the merchant (e.g., Starbucks™) twice in a day. Accordingly, in an implementation, duplicates can be removed so that only distinct (i.e. unique) payment-card holders are counted to provide more accurate results. That is, "double-counting" of payment-card holders due to multiple visits at a merchant is avoided for better accuracy.

In an implementation, the travel itinerary is customised based on a relevance score of the merchant suggested in step 208. There may be more than one factor to tabulate the relevance score. A relevance scope is one that indicates the relevance of the merchant included in travel itinerary. Various algorithms/rules may be applied to tabulate the relevance score. For each transaction that is made between the account holder and a merchant, the corresponding transaction data may include information such as the identity of the merchant ("Merchant name" or "Merchant ID"), time and date for which the goods/services relating to the transaction will be delivered, the type of industry (or industry-type) of the merchant delivering the goods/services and the time and date that the account holder may be at a certain venue. The relevance score may then be tabulated to indicate the relevance of the at least one merchant based on the industry-type of the suggested merchant and the industry-type of the distinct merchants. That is, if the industry-type of the suggested merchant is a spa resort and the account holder, Sam, often visits spa resorts during his past travels, the relevance score of the suggested merchant will be very high. In another example, if one merchant has transactions with a high percentage of foreign visitors in the region, the relevance score of such merchant will be very high for other foreign visitors. In specific implementations, more than one merchant may be included in the travel itinerary, and the merchants are ranked based on the corresponding scores for the merchants. That is, a merchant which has a higher relevance score will be ranked before a merchant which has a lower relevance score.

After the historical transaction data is retrieved in step 204 the identity of the merchants that participated in the previous transactions can be obtained/extracted, for example, using the corresponding merchant ID. Similarly, the identity of the merchant that will be rendering the goods or services in response to the current transaction will also be identified. Once the merchants are identified, their respective locations can be obtained by referring to a database having stored thereon the location (e.g. postal address, latitude/longitude) of each merchant in association with the merchant ID.

In this context, geographical location data of the merchant may include latitude and longitude coordinates and a postal address. The latitude and longitude coordinates may be in any suitable format, such as: (i) Degrees, minutes, and seconds (DMS), (ii) Degrees and decimal minutes (DMM), and (iii) Decimal degrees (DD). In one embodiment, the relevance score may be based on the distance between the location of the merchant included in the travel itinerary and a location of at least one of the merchants with whom the account holder has initiated transactions. For example, if the suggested merchant included in the travel itinerary is located near to a merchant (e.g., Starbucks) that the account holder has previously visited, the relevance score for the suggested merchant will be high.

In a further implementation, one of the plurality of historical transaction data may be obtained to identify a transaction budget of the account holder. The transaction budget refers to an amount that the account holder typically spends within a particular period of time for a particular aspect of travel. In this context, the step of tabulating the relevance score may involve the step of comparing the amount that the account holder typically spends at prior travel transactions to the amount expected to be spend at the merchant included in the travel itinerary. For example, if the amount that the account holder is expected to spend at the suggested merchant is about the same to the amount he typically spends at merchants he previously visited, the relevance score of the suggested merchant will be very high.

Similar to step 202 above, the current transaction data that is received contains the location at where the goods or services in response to the transaction will be rendered. The location of the merchant provides an indication of where the account holder will be based on the assumption that the account holder will be physically present at the location at the time in response to the transaction.

In an implementation, additional distinct (or unique) merchants are identified that are located in the vicinity of the location where the goods or services will be rendered according to the current transaction data. A location of each of the identified additional (distinct) merchant can be obtained by referring to the database further having stored thereon the location of each of the additional (distinct) merchants. The identified additional merchant may or may not include the merchant identified by the historical transaction data. That is, the identified additional merchants may include at least one new merchant whom the account holder has not initiated any transaction. In other words, the account holder may be introduced to a new merchant with whom he has not initiated a transaction.

A popularity index for each of these additional merchants is obtained via recommendation-providing social media platforms such as Foursquare™ or Facebook™ or recommendation-providing websites such as TripAdvisor™.

After the popularity indexes are obtained, each of the distinct merchants can be ranked based on the customer review. That is, a merchant that is has more positive customer reviews may be ranked before another merchant that is viewed to be less desirable. The travel itinerary can be customised in this order. In specific implementations, the at least one merchant included in the customised travel itinerary is presented to the user in an augmented reality setting.

Figure 3:
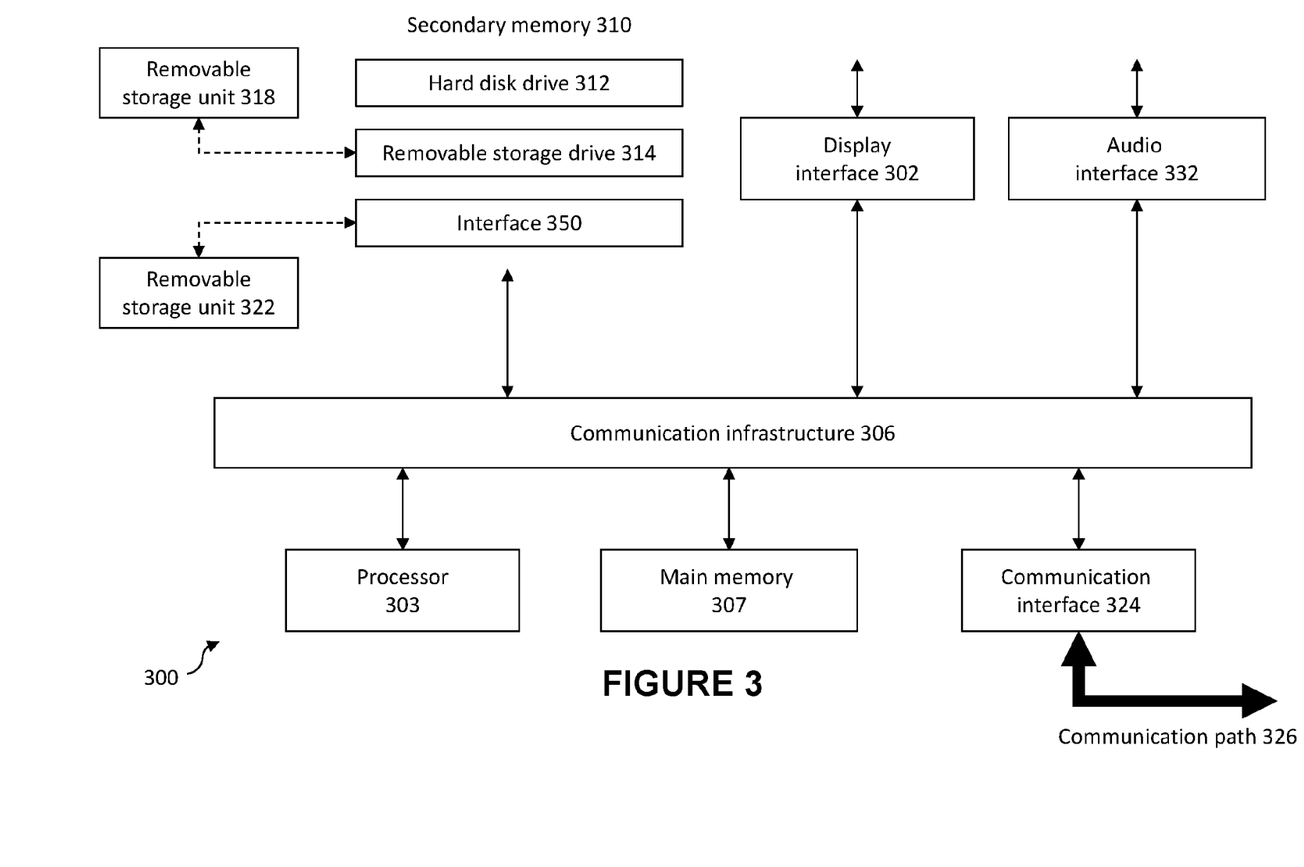
FIG. 3 shows a schematic diagram of a computer system suitable for use in executing the method for customising a travel itinerary.

FIG. 3 depicts an exemplary computer/computing device 300, hereinafter interchangeably referred to as a computer system 300, where one or more such computing devices 300 may be used to facilitate execution of the above-described method for providing a travel recommendation to a user. In addition, one or more components of the computer system 300 may be used to realize the computer 302. The following description of the computing device 300 is provided by way of example only and is not intended to be limiting.

As shown in FIG. 3, the example computing device 300 includes a processor 304 for executing software routines. Although a single processor is shown for the sake of clarity, the computing device 300 may also include a multi-processor system. The processor 304 is connected to a communication infrastructure 306 for communication with other components of the computing device 400. The communication infrastructure 306 may include, for example, a communications bus, cross-bar, or network.

The computing device 300 further includes a main memory 308, such as a random access memory (RAM), and a secondary memory 310. The secondary memory 310 may include, for example, a storage drive 312, which may be a hard disk drive, a solid state drive or a hybrid drive and/or a removable storage drive 314, which may include a magnetic tape drive, an optical disk drive, a solid state storage drive (such as a USB flash drive, a flash memory device, a solid state drive or a memory card), or the like. The removable storage drive 314 reads from and/or writes to a removable storage medium 344 in a well-known manner. The removable storage medium 344 may include magnetic tape, optical disk, non-volatile memory storage medium, or the like, which is read by and written to by removable storage drive 314. As will be appreciated by persons skilled in the relevant art(s), the removable storage medium 344 includes a computer readable storage medium having stored therein computer executable program code instructions and/or data.

In an alternative implementation, the secondary memory 310 may additionally or alternatively include other similar means for allowing computer programs or other instructions to be loaded into the computing device 300. Such means can include, for example, a removable storage unit 322 and an interface 340. Examples of a removable storage unit 322 and interface 340 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 322 and interfaces 340 which allow software and data to be transferred from the removable storage unit 322 to the computer system 300.

The computing device 300 also includes at least one communication interface 324. The communication interface 324 allows software and data to be transferred between computing device 300 and external devices via a communication path 326. In various embodiments of the inventions, the communication interface 324 permits data to be transferred between the computing device 300 and a data communication network, such as a public data or private data communication network. The communication interface 324 may be used to exchange data between different computing devices 300 which such computing devices 300 form part an interconnected computer network. Examples of a communication interface 324 can include a modem, a network interface (such as an Ethernet card), a communication port (such as a serial, parallel, printer, GPIB, IEEE 1393, RJ35, USB), an antenna with associated circuitry and the like. The communication interface 324 may be wired or may be wireless. Software and data transferred via the communication interface 324 are in the form of signals which can be electronic, electromagnetic, optical or other signals capable of being received by communication interface 324. These signals are provided to the communication interface via the communication path 326.

As shown in FIG. 3, the computing device 300 further includes a display interface 302 which performs operations for rendering images to an associated display 330 and an audio interface 332 for performing operations for playing audio content via associated speaker(s) 334.

As used herein, the term "computer program product" may refer, in part, to computer storage medium 344, removable storage unit 322, a hard disk installed in storage drive 312, or a carrier wave carrying software over communication path 326 (wireless link or cable) to communication interface 324. Computer readable storage media refers to any non-transitory, non-volatile tangible storage medium that provides recorded instructions and/or data to the computing device 300 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a SD card and the like, whether or not such devices are internal or external of the computing device 300. Examples of transitory or non-tangible computer readable transmission media that may also participate in the provision of software, application programs, instructions and/or data to the computing device 300 include radio or infra-red transmission channels as well as a network connection to another computer or networked device, and the Internet or Intranets including e-mail transmissions and information recorded on Websites and the like.

The computer programs (also called computer program code) are stored in main memory 308 and/or secondary memory 310. Computer programs can also be received via the communication interface 324. Such computer programs, when executed, enable the computing device 300 to perform one or more features of embodiments discussed herein. In various embodiments, the computer programs, when executed, enable the processor 304 to perform features of the above-described embodiments. Accordingly, such computer programs represent controllers of the computer system 300.

Software may be stored in a computer program product and loaded into the computing device 400 using the removable storage drive 314, the storage drive 312, or the interface 340. Alternatively, the computer program product may be downloaded to the computer system 300 over the communications path 326. The software, when executed by the processor 304, causes the computing device 300 to perform functions of embodiments described herein.

It is to be understood that the embodiment of FIG. 3 is presented merely by way of example. Therefore, in some embodiments one or more features of the computing device 300 may be omitted. Also, in some embodiments, one or more features of the computing device 300 may be combined together. Additionally, in some embodiments, one or more features of the computing device 300 may be split into one or more component parts.

In an implementation, the payment network server 108 may be generally described as a physical device comprising at least one processor 402 and at least one memory 404 including computer program code. The at least one memory 404 and the computer program code are configured to, with the at least one processor 402, cause the physical device to perform the operations above. An example is shown in FIG. 4.

For example, the method of FIG. 2 may be implemented as software and stored in a non-transitory fashion in the secondary memory 310 or the removable storage units 318, 322 of the computer device 300.

It will be appreciated by a person skilled in the art that numerous variations and/or modifications may be made to the present invention as shown in the specific embodiments without departing from the spirit or scope of the invention as broadly described. For example, the above description mainly discusses the use of a Bluetooth connection, but it will be appreciated that another type of secure wireless connection, such as Wi-Fi, can be used in alternate embodiments to implement the method. Some modifications, e.g. adding an access point, changing the log-in routine, etc. may be considered and incorporated. The present embodiments are, therefore, to be considered in all respects to be illustrative and not restrictive.

The invention claimed is:

1. A computer-implemented method for customizing a travel itinerary for an account holder, comprising:
   receiving, by a payment network server, current transaction data when settling a current travel transaction initiated by the account holder with a current merchant;
   retrieving, by the payment network server from a database, a plurality of historical transaction data relating to a plurality of historical transactions settled for the account holder prior to the current travel transaction;
   identifying, by the payment network server, one or more of the plurality of historical transactions that relate to the current transaction data to recognize preferences of the account holder;
   generating, by the payment network server, at least one merchant relevance score based on the plurality of historical transaction data, and based on time and date data corresponding to a time and date when the account holder may be at a certain venue;
   customizing, by the payment network server, a travel itinerary based on the preferences of the account holder and the at least one merchant relevance score, the travel itinerary including at least one merchant with whom the account holder can initiate a future transaction; and
   transmitting, by the payment network server to a transaction device of the account holder, a ranked indication of the at least one merchant included in the customized travel itinerary.

2. The method according to claim 1, further comprising:
   identifying a plurality of distinct merchants based on the plurality of historical transaction data; and
   obtaining an industry-type of each of the distinct merchants by referring to a database having stored thereon the industry-type of each of the distinct merchants,
   wherein the relevance score indicates the relevance of the at least one merchant based on (i) an industry-type of the at least one merchant and (ii) the industry-types of the distinct merchants.

3. The method according to claim 2, further comprising:
   obtaining a location for each of the distinct merchants by referring to the database further having stored thereon the locations for each of the distinct merchants,
   wherein the relevance score indicates the relevance of the at least one merchant based on the distance between the obtained locations and a location of the at least one merchant.

4. The method according to claim 1, further comprising:
   identifying a historical transaction amount for one of the plurality of historical transaction data to determine a transaction budget of the account holder,
   wherein the relevance score indicates relevance of the at least one merchant based on (i) a transaction amount with the at least one merchant and (ii) the transaction budget.

5. The method according to claim 1, further comprising:
   obtaining a location where goods and/or services will be rendered based on the current transaction data,
   obtaining a popularity index for each of additional distinct merchants located in the vicinity of the obtained location, the popularity indexes indicating popularity of each of the distinct merchants among other account holders,
   wherein the travel itinerary is customized further based on the popularity indexes.

6. The method according to claim 1, wherein the at least one merchant includes the current merchant.

7. The method according to claim 1, wherein the travel itinerary includes at least one further merchant, and the method further comprising:
   ranking the merchants in the travel itinerary based on the corresponding relevance score of the merchant.

8. The method according to claim 1, wherein the at least one merchant included in the customized travel itinerary is presented to the user as an augmented reality setting.

9. An apparatus for customizing a travel itinerary for an account holder, the apparatus comprising:
   at least one processor; and
   at least one memory including computer program code;
   the at least one memory and the computer program code configured to, with at least one processor, cause the apparatus at least to:
   receive current transaction data when settling a current travel transaction initiated by the account holder with a current merchant;
   retrieve, from a database, a plurality of historical transaction data relating to a plurality of historical transactions settled for the account holder prior to the current travel transaction;
   identify at least one of the plurality of historical transactions that relate to the current transaction data to recognize preferences of the account holder;
   generate at least one merchant relevance score based on the plurality of historical transaction data, and based on time and date data corresponding to a time and date when the account holder may be at a certain venue;
   customize a travel itinerary based on the preferences of the account holder and the at least one merchant relevance score, the travel itinerary including at least one merchant with whom the account holder can initiate a future transaction; and
   transmit a ranked indication of the at least one merchant included in the customized travel itinerary to a transaction device of the account holder.

10. The apparatus according to claim 9, wherein the at least one memory and the computer program code is further configured with the at least one processor to:
    identify a plurality of distinct merchants based on the plurality of historical transaction data; and
    obtain an industry-type of each of the distinct merchants by referring to the database having stored thereon the industry-type of each of the distinct merchants,
    wherein the relevance score indicates the relevance of the at least one merchant based on (i) an industry-type of the at least one merchant and (ii) the industry-types of the distinct merchants.

11. The apparatus according to claim 10, wherein the at least one memory and the computer program code is further configured with the at least one processor to:
    obtain a location for each of the distinct merchants by referring to the database further having stored thereon the locations for each of the distinct merchants,
    wherein the relevance score indicates the relevance of the at least one merchant based on the distance between the obtained locations and a location of the at least one merchant.

12. The apparatus according to claim 9, wherein the at least one memory and the computer program code is further configured with the at least one processor to:

identify a historical transaction amount for one of the plurality of historical transaction data to determine a transaction budget of the account holder, wherein the relevance score indicates relevance of the at least one merchant based on (i) a transaction amount with the at least one merchant and (ii) the transaction budget.

13. The apparatus according to claim 9, wherein the at least one memory and the computer program code is further configured with the at least one processor to:

obtain a location where goods and/or services will be rendered based on the current transaction data, obtain a popularity index for each of additional distinct merchants located in the vicinity of the obtained location, the popularity indexes indicating popularity of each of the distinct merchants among other account holders, wherein the travel itinerary is customized further based on the popularity indexes.

14. The apparatus according to claim 9, wherein the at least one merchant includes the current merchant.

15. The apparatus according to claim 9, wherein the travel itinerary includes at least one further merchant, and wherein the at least one memory and the computer program code is further configured with the at least one processor to:

rank the merchants in the travel itinerary based on the corresponding relevance score of the merchant.

16. The apparatus according to claim 9, wherein the at least one memory and the computer program code is further configured with the at least one processor to present, the at least one merchant included in the customized travel itinerary, to the user in an augmented reality setting.

17. A non-transitory computer-readable storage medium having stored thereon computer program code which when executed by a computer causes the computer to execute a method comprising:

receiving current transaction data when settling a current travel transaction initiated by the account holder with a current merchant;

retrieving a plurality of historical transaction data relating to a plurality of historical transactions settled for the account holder prior to the current travel transaction;

identifying at least one of the plurality of historical transactions that relate to the current transaction data to recognize preferences of the account holder;

generating at least one merchant relevance score based on the plurality of historical transaction data, and based on time and date data corresponding to a time and date when the account holder may be at a certain venue;

customizing a travel itinerary based on the preferences of the account holder and the at least one merchant relevance score, the travel itinerary including at least one merchant with whom the account holder can initiate a future transaction; and transmitting a ranked indication of the at least one merchant included in the customized travel itinerary to a transaction device of the account holder.

* * * * *